March 17, 1964 L. KULL 3,124,967
INCREMENTAL SERVO MECHANISM
Filed Aug. 1, 1961 7 Sheets-Sheet 1

INVENTOR.
Leo Kull
BY

March 17, 1964 L. KULL 3,124,967
INCREMENTAL SERVO MECHANISM
Filed Aug. 1, 1961 7 Sheets-Sheet 3

INVENTOR.
Leo Kull
BY

March 17, 1964 L. KULL 3,124,967
INCREMENTAL SERVO MECHANISM
Filed Aug. 1, 1961 7 Sheets-Sheet 4

INVENTOR.
Leo Kull
BY

INVENTOR.
Leo Kull
BY

INVENTOR.
Leo Kull
BY

March 17, 1964          L. KULL          3,124,967

INCREMENTAL SERVO MECHANISM

Filed Aug. 1, 1961          7 Sheets-Sheet 7

INVENTOR.
Leo Kull
BY

United States Patent Office 3,124,967
Patented Mar. 17, 1964

3,124,967
INCREMENTAL SERVO MECHANISM
Leo Kull, Jersey City, N.J.
(2 Washburn Place, Caldwell, N.J.)
Filed Aug. 1, 1961, Ser. No. 128,512
13 Claims. (Cl. 74—157)

This invention relates to servo mechanisms in which the servo control is obtained by mechanical means without using hydraulic or pneumatic circuits or electrical balancing means.

Servo mechanisms have very wide uses for various control applications and the term servo can be applied to mechanisms where certain basic requirements are satisfied. Basically, a servo is a mechanism which seeks a balanced condition in a control system. It has an input and an output and the balance it seeks is between the input and output. Therefore it has to be able to seek the error, determine the error and perform a correcting action between the input and output until the balance is reached again.

The input usually is a low torque movement while the output might vary greatly in its nature. In one form it may be a movement in the same direction and amplitude as the input movement and may be called a follow-up or a force amplifier servo. To this kind of servos belong applications like power steering, platform positioners, etc. The other basic kind, is a regulating servo in which the input controls a regulating device and the output is a regulating action, examples of which are temperature or voltage regulation, vehicle guidance, etc.

The control in a servo mechanism is obtained through a closed system, known as a control loop and the controlling action is known as servo feedback. As presently known, the feedback in a servo control loop can be controlled by pressurized air or liquids which usually are positioning a piston in a cylinder as the output means, while the input moves a divider piston which directs the flow one way or the other. In electrical systems, the servo is seeking a balance of electrical currents in which the best known input means is a potentiometer which is controlling the rotation of a servo motor as the output means.

In my present invention a novel mechanical incremental drive is used which can drive a wheel in either direction according to the information received while sensing the error or deviation from a neutral position. Only one simple part is used to do the sensing and carry out the correcting action. The power input for this particular servo has to be a reciprocating motion which can be easily produced by an electric motor or any available power source. One of the strokes of the reciprocating motion is used to sense the error and the other stroke is used to carry out the correction according to the error.

The input of the servo is a rotary or a straight line movement of an arm which can be specially shaped or can be any instrument needle or pointer. Such a pointer has its neutral or "0" position in which the system is balanced and no correction follows, whereas any position either way from the "0" position causes the system to perform a correcting action toward the "0" position.

The drive arrangement is similar to a ratchet drive which has a special pawl which can drive the ratchet wheel in either direction while the error detection merely shifts the pawl to one of the two drive positions from which it can drive the wheel in a direction which performs a correcting action. A third or a balanced condition exists in which case the pawl stays neutral and does not move the wheel.

The error correction is accomplished through a properly geared feedback from the output wheel to the sensing station. This action will be continuously carried on until the neutral or balance is obtained.

The applications of my invention differ greatly in their nature and they determine various main factors, such as speed and torque. The number of strokes for instance can be as fast as 25 per second or as slow as one stroke an hour. The power source is determined by the output torque required and here again the speed is an important factor. For instance, for a slow speed regulating servo a small low cost motor can perform satisfactorily.

A family of servos, therefore, can be controlled by my novel mechanical drive. They can be classified and named by their different applications. The output wheel of the servo is driven stepwise where a small movement of an input needle is multiplied to a considerably greater movement with greater torque. If the number of steps per revolution is ten, the servo can be called an analog to digital servo converter, since it takes an analog movement of an instrument needle and gives a digital output if decimal wheels are driven by the output shaft.

If there are an input and an output shaft which move at the same speed and distance but the output shaft with greatly amplified torque, the servo may be called a mechanical force amplifier or a follow-up servo.

If the output is used to turn a regulating device like a rheostat, temperature, pressure or flow control and the feedback is indirect, the system may be termed a regulating servo. By indirect feedback is meant a condition in which the output shaft turns a regulating device which in turn changes the controlled condition and the latter gives the feedback to the condition sensing instrument.

The mechanical servo control has the advantage of not using any additional equipment to produce an hydraulic fluid pressure or pressurized air or closely regulated supply of D.C. currents. Further, it does not use the torque of the input needle and this has an advantage of permitting the use of very sensitive instrument needles directly as input means. The drive power is directly applied to the output shaft which makes it possible of obtaining very high amplification ratios. The stepwise drive of the output shaft makes it especially suitable to drive digital wheels for visual reading or for actuating contacts or code drums for coded electrical output.

An object of the invention is to provide a mechanical servo control loop using a reciprocating power input for sensing an input means and performing an output according to the information received during sensing the input.

A further object is to provide an actuating linkage to perform the sensing and correction in a servo loop.

Another object is to provide a servo control loop which receives a low torque analog input and gives a high torque digital output.

Another object is to provide a regulating servo which is able to turn a regulating device, receiving its orders from an instrument.

The invention is described in more detail in the following specification and illustrated in the accompanying drawings, in which.

In the following specification sub-headings are used to distinguish different kinds and applications of the servo family. The characteristic drive principle is the same in all cases and will be described first. Similar parts have the same reference numerals throughout the specification.

Basic Drive Principle

In order to control my servo mechanism by fully mechanical means, a novel two directional wheel drive control is first described. The object of this drive is to use low torque input means to govern the drive direction of an output wheel using an external power source to do the actual driving of the output wheel without wasting any torque of the input means at all. The power input for the drive is a reciprocating motion of a certain amplitude. A motion of this kind can be readily produced by an electric motor, solenoids, power pistons etc.

The drive mechanism in a preferred form is shown in FIGS. 1 to 5 where the power stroke is applied to a link 20 and its reciprocating motion is indicated by an arrow 21. The control element or input for the drive has a movement perpendicular to the movement of the power stroke and is illustrated by a movable input or control member 22, which may be an instrument pointer. The pointer can be a free moving pivoted instrument needle or any other moving element which has a control movement at right angles to the power stroke. The pointer 22 will be sensed by a driver or actuating part 23, which in a preferred form is designed to serve also the function of driving a toothed wheel 24 in a direction which will be determined during sensing of the pointer 22 by the actuating part 23.

Driver part 23 has an elongated hole 25 which receives a pin 26, the latter being secured to the link 20. An over-center spring 27 has one end hooked to a pin 28 secured to link 20, and the other end is hooked to a lug 29, struck-up from the stock of driver part 23. In its normal position the spring 27 keeps the pin 26 against the upper end of the elongated hole 25. Driver 23 has two driving pawls 30 and 31, and two sensing corners 32 and 33. The driver 23, as well as the complete drive system is symmetrical about the centerline of the link 20.

Figure 6:
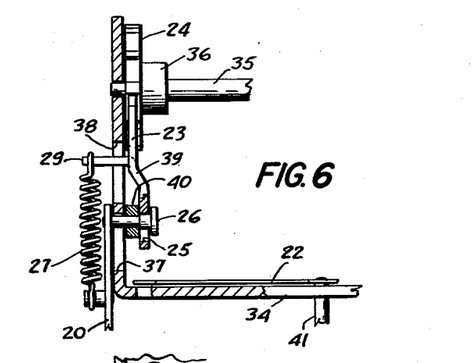
FIGS. 6 and 7 show sectional views of the drive and sensing parts shown in FIGS. 1–5.
Figure 7:
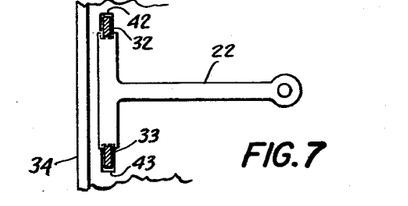

In FIG. 6 a more detailed sectional side view of the parts is shown, wherein an L-shaped section or plate 34 of a framework provides a bearing for an output shaft 35, to which wheel 24 is secured by means of a hub 36. Further, plate 34 has a vertical guide slot 37 to guide pin 26 and a clearance opening 38 is provided for the lug 29. Driver 23 is slightly offset at 39 and a spacer 40 keeps the lower end of driver 23 at a proper distance from plate 34. The pointer 22 as best shown in FIG. 7 is a T-shaped thin part which is controlled by an input shaft 41. In FIG. 7 there is shown only the sensing ends 32 and 33 of driver 23 and clearance openings 42 and 43 in plate 34.

Figures 1, 2:
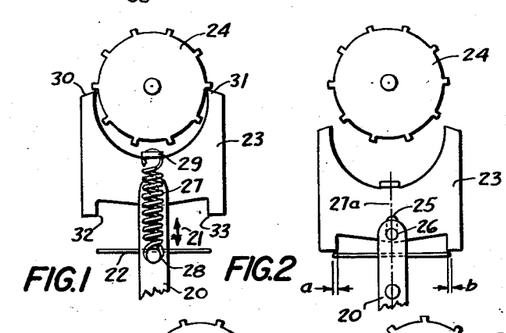
FIGS. 1–5 are schematic views showing various steps in sensing and driving of the input and output of a servo mechanism embodying my invention.

Initially, the reciprocating movement of link 20 is a downward movement which may be called a sensing stroke. FIG. 2 illustrates a neutral sensing position wherein pointer 22 is symmetrically positioned and stops both sensing corners 32 and 33 of the driver 23. As the downward stroke of link 20 continues, the pin 26 leaves the upper end of hole 25 and the spring 27 will be tensioned further. This is the sensing of a balanced condition and during the upward stroke of link 20 and driver 23 no teeth of wheel 24 will be picked up and the latter will not be rotated. In FIG. 2 spring 27 is indicated by a centerline 27a. As seen in FIG. 6 the pointer 22 is normally free to move and has a small clearance above plate 34. However, it is flexible enough to be forced against plate 34 during a sensing action and a very light and thin material is sufficient to stop driver 23 since the only sensing force applied to it is the one exerted by the spring 27.

Figure 3:
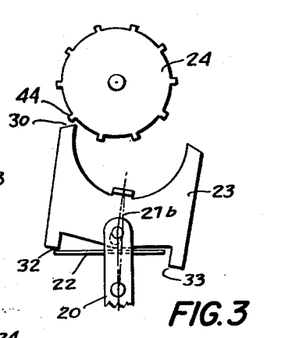

In FIG. 3 the pointer 22 is shown as moved slightly to the left. During sensing, the corner 32 will be stopped by the pointer while the corner 33 can freely pass the pointer. This action tilts the driver 23 about the pivot pin 26 to the right and this will be further assisted by spring 27 which is shown as a centerline 27b in an over-center position. The pawl 30 has now moved underneath the tooth 44 and during the upward stroke of the driver 23, the wheel 24 will be rotated one step in a clockwise direction until the position, shown in FIG. 1 is reached again.

Figure 4:
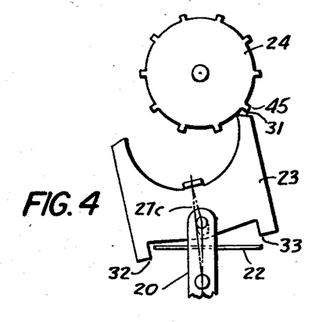
Figure 5:
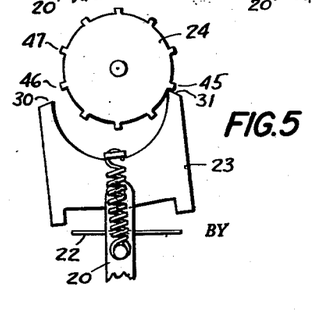

In FIG. 4 the opposite to FIG. 3 is shown as having taken place the pointer 22 being slightly off center to the right in which position it stops the sensing corner 33 and clears corner 32 with spring 27, expressed by centerline 27c, now assisting the tilting of driver 23 to the left. Pawl 31 on the return stroke picks up tooth 45 and will drive the wheel 24 one step in a counter-clockwise direction. A mid position is shown in FIG. 5 where the driver pawl 30 can pass tooth 46 and engage a tooth 47 to reach again the position, shown in FIG. 1. Tooth 47 also prevents positively any possible overtravel due to inertia of wheel 24 during a fast operation.

The foregoing describes a push-type two-way ratchet drive which works below the horizontal centerline of wheel 24. Similarly to a common ratchet drive, which can work either push or pull type, my two directional ratchet drive can be also designed as a pull-type, in which case the pulling ends of driver part 23 will work above the horizontal centerline of wheel 24.

Figure 8:
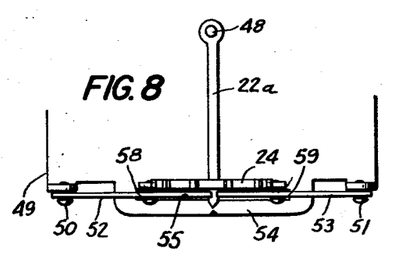
FIGS. 8 and 9 show modified sensing details embodying my invention.
Figure 9:
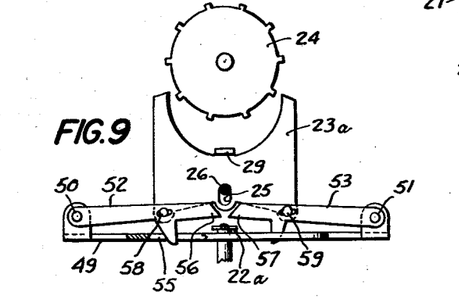

In FIGS. 8 and 9 there is shown a modified sensing arrangement which can sense any instrument needle directly and consists of a pointer 22a which is pivoted at 48 and can be the needle of any instrument. A section of a framework 49 is shown and provides pivot points at 50 and 51 for sensing arms 52 and 53, and a support 54 underneath the pointer 22a. A slot 55 in framework 49 serves as the guide for sensing arms 52 and 53, and provides clearance for sensing corners 56 and 57. The driver 23a in this case is pivotally secured at 58 and 59 to sensing arms 52 and 53, the holes in the arms 52 and 53 being slightly horizontally elongated in order to make the movement of the linkage possible. Only the drive pin 26 is shown in slot 25, the spring 27 and drive link 20 being the same as previously described.

The working principle of the arrangement is the same as shown in FIGS. 1–5 with the difference that the sensing corners 56 and 57 are closer together. If corner 56 for instance is stopped by pointer 22a, the pin 58 also is stopped and driver 23a will be tilted to the right about pin 58. The arrangement makes it possible to have sensing corners 56 and 57 very close together for sensing a fine instrument needle with great accuracy.

Numerous other arrangements and shapes of the parts described are possible which can be suited to various applications and which can carry out the basic sensing and driving function of the invention, using the reciprocating motion as the power input.

Analog to Digital Servo

Figures 10, 11:
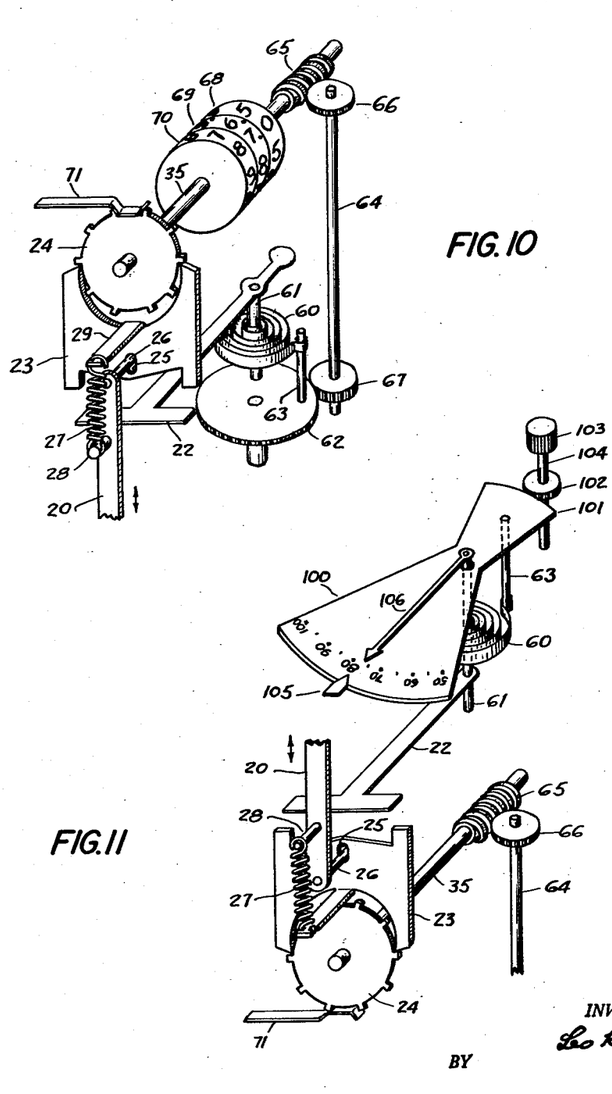
FIG. 10 is a schematic illustration of a directly closed servo loop for a digital temperature readout.
FIG. 11 is a schematic illustration of a temperature regulating servo control with an indirectly closed servo loop.

The fact, that the output wheel 24 is driven stepwise and 10 steps per revolution can be conveniently selected, lends itself easily to the use as an analog to digital converter for obtaining digital reading from various instruments. FIG. 10 illustrates schematically an example which gives a digital reading from a temperature responsive bimetallic coil 60. This is a closed servo control loop which has the basic drive parts as described hereinbefore: namely, the drive link 20, spring 27, driver 23, output wheel 24, shaft 35 and pointer 22. Pointer 22 has a shaft 61 to which is secured one end of the bimetallic coil 60, the other end being secured to a feedback wheel 62 by means of a pin 63. A countershaft 64 connects wheel 62 to the drive shaft 35 through a worm 65 secured to shaft 35, which worm drives a wheel 66 which in turn drives the shaft 64, pinion 67 and the feedback-wheel 62. This completes the closed servo loop in which the bimetallic coil 60 acts as the responsive measuring element which directs the output of the servo system.

A rise of temperature causes the bimetallic coil 60 to change its shape and turn the shaft 61 and pointer 22 clockwise, for instance. If the pointer was in a "0" or neutral position before the temperature rise, it will be slightly off center now. As the driver 23 comes down, it will sense the off condition which causes it to be tilted to the right and during its upward stroke it will turn the wheel 24 one step in a clockwise direction. This step is geared down properly and will turn the wheel 62 a small step in the counter-clockwise direction. Pointer 22 is connected to the wheel 62 through the coil 60 and consequently will be turned together with wheel 62. If the temperature rise continues, a similar correcting action takes place; if it stops, a neutral or balance is obtained and no correcting action results; if the temperature starts falling, a correcting action in the opposite direction will start and will continue until the balance is reached again.

The small distance and small torque movement of pointer 22 is thus sensed and multiplied in magnitude and force and is expressed as the movement of shaft 35. In the present case the number of teeth on wheel 24 is ten which makes it suitable for a direct drive of a decimal indicating wheel 68. A detent spring 71, acting on wheel 24, helps the proper indexing for shaft 35 and wheel 68. Additional indicating wheels 69 and 70 on shaft 35 are driven by well known Geneva drives and thus increase the readability range.

The gear ratio between wheel 24 and wheel 62 can vary greatly and will be determined by the required accuracy of reading and the range of bimetallic coil 60. If the coil has a control range of 100° F. in a 180° working angle and an accuracy of .5° F. is required, there will be 200 divisions per 180° or 400 per 360°. Wheel 24 already covers 10 indexing positions per revolution and consequently a reduction of 40:1 is required from shaft 35 to wheel 62. Although any suitable reduction gearing may be used, the worm reduction from shaft 35 offers certain advantages, namely, a great reduction ratio and a right angle drive in one direction, since wheel 62 cannot drive the worm.

From the foregoing a conclusion may be drawn that the purpose of the control loop is to respond to the small movement of the element 60, amplify the movement and torque greatly, provide a useful output action and reduce the amplified movement of pointer 22 to a movement which counteracts the original movement of the pointer 22 and tends to return it or cancel it out. From this it follows that the relative change of the ends of bimetallic coil is taken up by the feedback or the movement of the pin 63 and the pointer 22 tends to maintain its "0" or neutral position in relation to the framework.

The accuracy of the illustrated case is 1/400 of a revolution which means that a movement of 360/400 of a degree results in one wheel step which was .5° F. The indicating wheel therefore has an indicia of 0–5–0–5–0–5–0–5–0–5 and a carryover every second step. This means that the Geneva drive wheel, instead of a common one place carryover point has five carryover points.

The movement of 360/400 degrees amounts to a certain feedback distance to the pointer 22 in relation to the driver 23 which should be less than the total overlapping distance $a+b$ in FIG. 2. If distance $a+b$ is smaller than the feedback distance, a "hunting" condition may result if it be assumed wheel 24 is driven clockwise one step (FIG. 3). This causes the feed back to move pointer 22 to the left a distance which in that case will be greater than $a+b$ and the next sensing causes the driver 23 to be tilted to the opposite direction. Though there is still some overlap between pointer 22 and corners 32 and 33, the condition very seldom reaches equilibrium and most certainly keeps hunting back and forth. A suitable overlap $a+b$ seems to be about 1.5 feedback steps, but greatly longer overlaps might be desirable for some special conditions where a limit control is required.

Many factors have to be considered when selecting the input speed. If the digital temperature indicator is used to record outdoor temperature, for instance, there is a relatively slow action. The temperature change per hour seldom exceeds 10° F. and to provide a .5° F. accuracy, 20 steps per hour or one stroke every 3 minutes is sufficient. A small synchronous clockmotor which is available with the reduced output speed can best be used for this application.

The servo loop, just described, can be adapted to various applications with different responsive elements instead of the temperature control coil. For example: besides driving visual reading wheels, the shaft 35 can be used to drive various cam and contact arrangements which can be set to perform switching actions precisely on a desired control point. Electrical position reading means, such as code drums with contacts can be conveniently driven by shaft 35 to give electrical readout for data processing. Further, indicating wheels can be replaced by printing type wheels and a printing arrangement, timed by a synchronous drive motor, may provide periodical automatic temperature readings in a printed form.

Modified Analog to Digital Servo

Figures 14, 15:
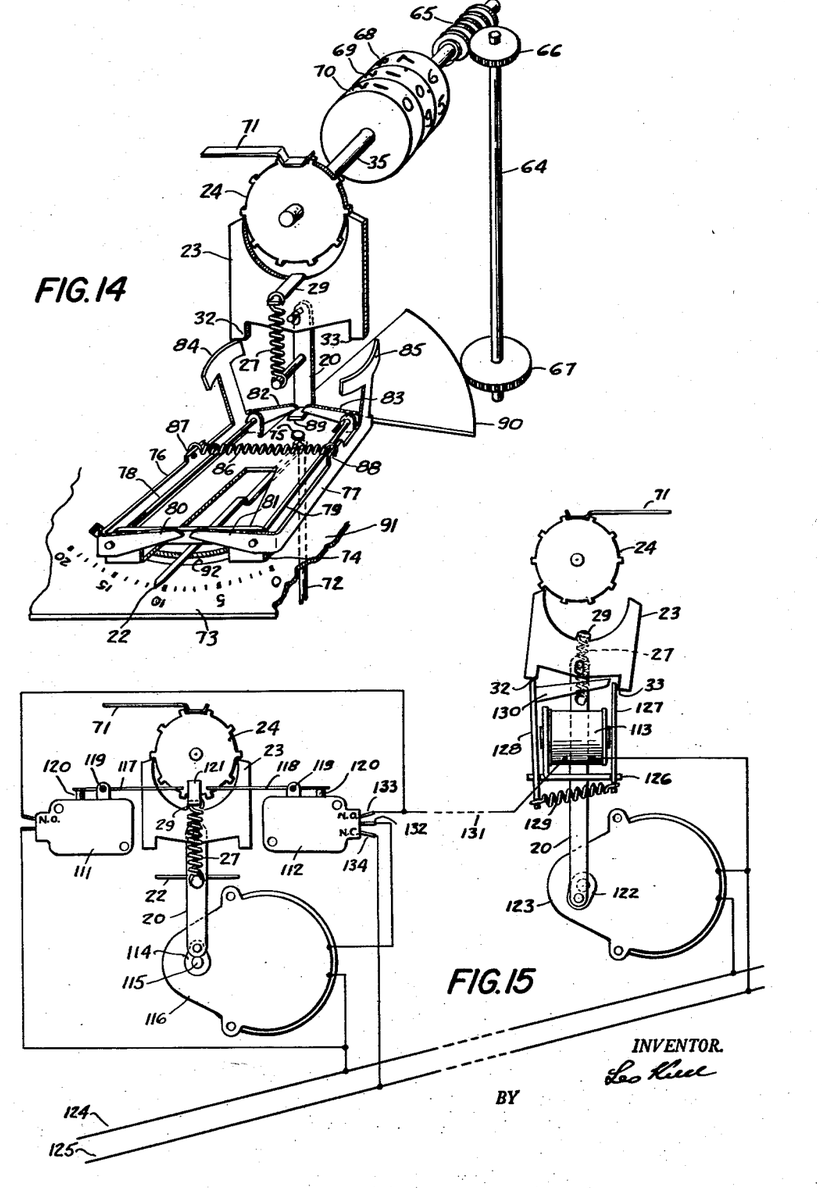
FIG. 14 is a schematic illustration of a modified directly closed servo loop for a digital readout.
FIG. 15 is a schematic illustration for an electrical output of a servo with a receiving mechanism at a remote location.

In FIG. 10 both ends of the bimetallic coil 60, as the temperature responsive element, are moving points. In common instruments, however, one of the ends of the responsive element is secured to the framework, while the other is rotating the pointer. To use a pointer of this kind as the input means for a closed loop servo, a slightly modified construction is required. A differential in the system may be used or an arrangement which is able to follow the input pointer has to be employed. The latter is shown in FIG. 14 and includes the parts, as described hereinbefore, namely, driver 23, wheel 24 with shaft 35, indicating wheels 68, 69 and 70, worm 65, countershaft 64 with its wheels 66 and 67 and drive link 20 with its spring 27.

Pointer 22 has a shaft 72 which can be the output shaft of any condition responsive element (not shown) and which gives its reading on a conventional scale 73. The pointer 22 is not sensed directly by driver 23 but instead, a follow-up arm 74, pivoted at 75 carries two control levers 76 and 77 which are pivotally secured to it by means of rods 78 and 79. The levers 76 and 77 have sensing arms 80 and 81, actuating arms 82 and 83 and arms 84 and 85 the positions of which may be sensed by the sensing corners 32 and 33 on the driver 23. A spring 86, hooked to lugs 87 and 88, gives a turning moment to sensing arms 80 and 81 toward pointer 22. Actuating link 20 reciprocates again vertically and it has an angular portion 89 which during the upper extreme of lever 20 causes the sensing arms 80 and 81 to clear pointer 22 by lifting up arms 82 and 83.

During the downward stroke of the driver 23 a double sensing takes place to wit: before driver 23 can do its sensing, arms 80 and 81 have sensed the pointer 22, resulting in the blocking of both of the arms or one of them. If sensing arm 80 is blocked by pointer 22, arm 84 will be stopped underneath the corner 32 and arms 81 and 85 can move further, the latter clearing corner 33. Driver 23, in its last part of the downward stroke, will be tilted to the right which sets it for a clockwise step during its upward stroke. The movement of the correcting step is properly geared down to a sector gear 90 which is a part of the follow-up arm 74. Arm 74 moves above a stationary plate 91 which carries the scale 73 provides support for the pointer 22 and has a clearance slot 92 for the arms 80 and 81.

The counter-clockwise drive is the opposite to the one, just described, while in case of neutral, arms 84 and 85 are stopping both of the sensing corners 32 and 33, resulting in no drive stroke. Arms 84 and 85 are curved, having their centers of radii on the centerline of pivot point 75, which renders possible the sensing of them by drivers 23 with the arm 74 in any position between its limits.

Output wheels as described hereinbefore can be attached to shaft 35. As illustrated, the arrangement has a 20 division scale with decimal indicating wheels which read to the accuracy of 0.1. This divides the scale to 200 divisions. As an alternative, a 100 division accuracy on a 20 division scale dictates the use of a special indicating wheel for the last place which has two sets of prime numbers and two carryover points. The reading accuracy is then 0.2.

*Follow-Up Servo*

Figures 12, 13:
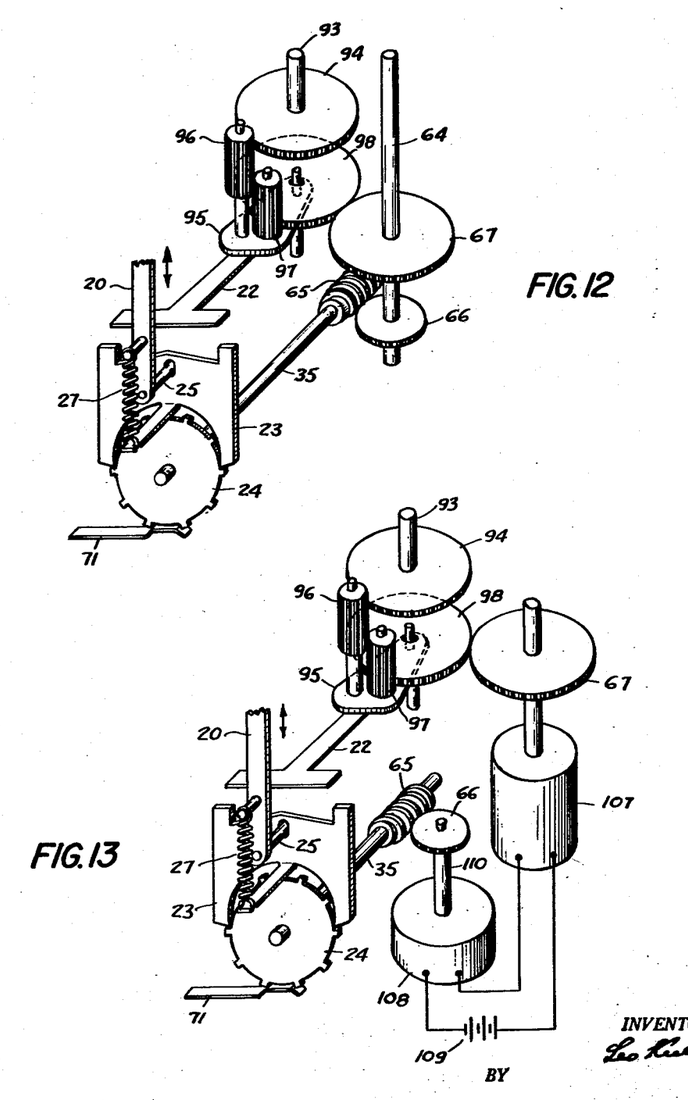
FIG. 12 is a schematic illustration of a torque amplifying servo with a directly closed servo loop.
FIG. 13 is a schematic illustration of the conversion of the torque amplifier to a regulating servo with an indirectly closed servo loop.

A different version of a servo control which can be used in place of the one shown in FIG. 14 is illustrated in FIG. 12. It introduces the adaptation of a differential gearing as the part of the control loop. Drive parts as hereinbefore are in use again to wit: drive link 20, driver 23 with its spring 27, wheel 24 with its shaft 35 and worm 65, detent spring 71, pointer 22 and countershaft 64. A conventional spur gear type differential, as illustrated, consists of three concentric members, free to rotate in relation to each other on a common axis. They are an input shaft 93 with its gear 94, a spider arm 95 with its reversing pinion pair 96 and 97 and an output or feedback gear 98. Input gear 94 is in mesh with pinion 96, the latter is in mesh with pinion 97 which in turn is in mesh with wheel 98 which receives also the feedback from the countershaft 64.

If shaft 93 is turned, say clockwise, the spider arm 95 turns pointer 22 also in a clockwise direction while gear 98 remains stationary. The driver 23 during its sensing stroke will be tilted to the right and wheel 24 will be driven one step in a counter-clockwise direction. This will turn shaft 64 in a clockwise and wheel 98 in a counter-clockwise direction and considering now the shaft 93 to be stationary, the pointer 22 will be moved also in a counter-clockwise direction toward the "0" or neutral position. Consequently the rotation of the input shaft 93 in any direction causes the output shaft 64 to be rotated in the same direction and if gears 98 and 67 are of the same size, their speed will be also the same. Though the spider arm 95 is the most logical member for the pointer 22, any combination, concerning the selection of three rotating members of a differential for the input, ouput and pointer 22, can be adopted with the same results.

The advantage of using the differential in the servo loop is a limitless operation for input and output shaft with a greatly amplified torque on the output shaft. If an instrument needle is used to drive shaft 93 and indicating wheels are attached to shaft 35, the arrangement lends itself for the same use as the one, shown in FIG. 14. However, the movement of shaft 93 is not completely free as compared to the shaft 72 in FIG. 14, because of the small friction required to overcome the rotation of pinions 96 and 97.

Since shafts 93 and 64 will be rotated identically, the arrangement may be called a follow-up servo or a mechanical torque amplifier. As just one example application, the shaft 93 may be turned by a low torque clock movement and the output shaft 64 will follow this movement but with greatly amplified torque.

*Regulating Servo*

The regulating servos could be distinguished from the others by the fact, that there is no direct or positively transmitted feedback. The feedback is impassive to the responsive element but operates for correcting or adjusting it through a controlling device which is able to change the condition. This makes it possible to set a desired value for a condition sensing element and make the servo to turn the controlling element which has the capacity of changing the condition until the present instrument reading is reached.

In its construction the regulating servo is very similar to a closed loop servo. In FIG. 11 there is shown a temperature regulating servo which has the same bimetallic coil 60 as shown in FIG. 10. Shaft 61 rotates the pointer 22 and has one end of the coil 60 secured to it. The other end of the coil 60 is secured to the pin 63 and the latter is secured to a dial plate 100 which is freely rotatable concentric with shaft 61. One side of the dial plate 100 has teeth 101 which mesh with a pinion 102. A knob 103 on shaft 104 is provided to set the dial 100 in respect of a stationary pointer 105 which indicates the desired temperature reading.

Similar drive parts as previously described are employed with the characteristic difference that shaft 64 does not deliver its feedback to the other end of the temperature responsive coil 60 but is used to turn a controlling device. The latter is not illustrated because it can be any temperature regulator which can be controlled by a shaft rotation. The most common control devices of this kind are gas valves, oil burner controls, radiator valves, the control of air ducts or electric heat controls.

In its operation the dial plate 100 is first set to the desired temperature reading as indicated by pointer 105. This usually offsets the pointer 22 which may be made visible above dial 100 by a pointer 106 secured also to the shaft 61. The unbalanced condition is sensed by driver 23 to rotate shaft 35, to turn shaft 64 and the controlling device in a direction which will increase the heat if the higher temperature was set or vice versa. The rotation of shaft 64 will continue until the neutral position of pointer 22 is reached or in other words until pointer 106 is in alinement with pointer 105.

There is usually a lag or slow response in temperature regulation and this may cause a condition where the controlling device, which usually has its working limits, reaches its end before a balance is reached. To overcome the difficulty of jamming or breaking if a limit is reached, a friction clutch which can permit slippage could be introduced somewhere between wheel 24 and a controlling device (not shown). After each new setting an overshooting may result, the extent of which will be determined by the capacity of the controlling device and the correcting speed. This, however, will die out soon and the system will stabilize itself.

The described regulating principle can be applied to a wide variety of regulating servos with various sensing elements and corresponding controlling devices, examples of which include: pressure gauges and pressure regulating valves, galvanometers and rheostats, liquid level and flow control valves, speed and speed control devices, compasses for direction and steering, etc.

Regulator With a Differential

Most regulating controls work between two limits. The exception is a speed governor in which the regulation has to be performed on the "fly." FIG. 13 shows an arrangement, similar to FIG. 12 which can be used to govern the speed of a direct current electric motor 107 by means of a rheostat 108 and a voltage source 109. The speed of motor 107, regardless of used torque or varying input voltage, can be kept at a constant value by turning a shaft 110 of the rheostat 108.

To illustrate a practical case, the shaft 93 may be turned by a clock movement at a speed of ⅕ r.p.m. which is 5 min. per revolution. The desired constant speed of motor 107 is geared down to turn wheel 98 at ⅕ r.p.m., but in the opposite direction to wheel 93. If the clock and motor are started at the same time and their speed in respect to wheels 94 and 98 is the same, the pointer 22 will not move and remains neutral. If, however, the used torque of motor 107 is increasing, it will slow down and move pointer 22 out of balance. This starts the drive to wheel 24 which turns the rheostat 108 in a direction which reduces the resistance to the motor 107 and as a result, will increase the speed of it. The opposite happens if the speed of the motor 107 tends to go too high. From this it follows that the servo continuously adjusts the rheostat 108 which keeps the speed of motor 107 same as the low torque input speed to shaft 93.

Various considerations have to be taken in account while determining the speed of wheels 93 and 98 and also to the link 20, the movement for which can be picked up directly from motor 107 in this case. If motor 107 has to make a certain number of revolutions in a long time interval without caring too much about small differences now and then, a relatively slow speed to wheels 93, 98 and link 20 can be selected. For more precise control, however, the speed should be increased in order to turn the shaft of the rheostat 108 fast enough to cover all the variations of motor 107.

Electrical Control

The utility of my servo drive can be increased by adding electrical control means to it. A contact closure or electrical pulse output can be provided by adding electrical contact means or micro-switches to the drive mechanism. The object of this is to generate an electrical pulse for each drive step and distinguish them by closing one circuit for one direction, the other circuit for the other direction and no closure for the neutral position. The pulses of this kind can be conveniently used in data recording systems and they also provide a means to transmit the position of a servo wheel to a remote location where another identical wheel can be rotated in synchronism with the transmitter wheel. A receiver of this kind can be a conventional two-directional electromagnetic counter in which one solenoid is actuated by one of the transmitter contacts and the other solenoid by the other contacts of the transmitter. This requires two extra transmission wires.

In FIG. 15 a schematic arrangement with one extra wire is illustrated. The output pulses are generated by two micro-switches 111 and 112 in the transmitter unit and a single receiving coil 113 is used to receive them in the receiving unit. The transmitter unit on the left will be controlled by pointer 22 which is the part of any suitable servo loop, as described hereinbefore, having similar drive parts. The link 20 is driven by a crank 114, attached to a shaft 115 of a synchronous timing motor 116. Driver 23 is shown in its start position. Micro-switches 111 and 112 have their actuating leafs 117 and 118 pivoted at 119 and are adapted to operate switch buttons 120 in a well-known manner. In the position shown, the ends of leafs 117 and 118 will clear an extension 121 of lug 29. After a neutral sensing (FIG. 2) the lug 121 during its upward stroke clears the switch leafs and no pulse is generated. If pointer 22 moves to the left, driver 23 will be tilted to the right (FIG. 3), wheel 24 will be driven clockwise and lug 121 during its upward stroke will contact leaf 118 and actuate micro-switch 112. Similarly, if pointer 22 moves to the right, the wheel 24 will be driven counter-clockwise (FIG. 4) and micro-switch 111 will be pulsed.

The receiver on the right has identical drive parts; namely, wheel 24, driver 23 and the link 20 driven by a crank 122 of a motor 123. Both motors 116 and 123 are operated in synchronism which is maintained by connecting them to same A.C. line 124 and 125. The receiving coil 113 can be a conventional relay coil, having a bracket 126 which provides pivots for its two armatures 127 and 128 and also serves as a part of the magnetic circuit. A spring 129, hooked to the ends of armatures 127 and 128, keeps them normally apart from the core of coil 113. The unequal arm length for the spring guarantees a smaller resistance to armature 127 and a greater one to the armature 128. If coil 113 is connected directly to the A.C. line, both armatures will be pulled in, but if a resistance is added to the circuit, only armature 127 will be pulled in because armature 128 has a greater spring resistance and its magnetic circuit is partially shorted by the bracket 126.

The control to the driver 23 is similar to the one shown in FIG. 14: sensing corners 32 and 33 can be selectively blocked by the ends of armatures 127 and 128. In the illustration the armature 127 is shown being pulled in, driver 23 is tilted to the right and wheel 24 will be driven in a clockwise direction. If both armatures are pulled in, the drive direction of the wheel 24 has to be counter-clockwise. In this case the ends of both armatures are clearing corners 32 and 33, but the driver 23 should be tilted to the left. The tilting can be accomplished by an additional arm 130, bent over from the stock of armature 128, and which acts as blocking means to corner 33. Consequently, if armature 127 is actuated, corner 33 is free and 32 stays blocked, if both are actuated, corner 32 is free and 33 stays blocked by arm 130, and if there is no actuation, both corners are blocked and a neutral condition is sensed.

In the illustration, switch 111 is used to connect coil 113 directly to the A.C. lines 124 and 125 and switch 112 can make a series connection through a resistance which in the present case is the coil of the synchronous motor 116. If switch 111 is actuated, the circuit from line 124 goes through the switch contacts and an extra connecting line 131 to coil 113 and back to line 125. If switch 112 is actuated, the circuit starts again from line 124 but goes through the coil of motor 116, through contacts 132 and 133, line 131 and coil 113 to line 125. To keep motor 116 running continuously, a third contact 134 of switch 112 is provided. This is connected to line 125 and connects motor 116 directly to the power line. The actuation of switch 112 merely switches the circuit of motor 116 from the direct connection to the line 125 to a series connection through coil 113.

To make the system operate, the motors 116 and 123 have to run with a same synchronous speed and the crank-arms 114 and 122 have to have a relationship which times the start of the output pulse a little ahead to the moment when corners 32 and 33 reach the ends of armatures 127 and 128. This means that the receiver is about half a cycle behind. In the illustration a pulse was given about a quarter of a cycle before by switch 111. Wheel 24 in the transmitter was driven clockwise one step, armature 127 was pulled in, driver 23 in the receiver tilted to the right and its wheel 24 is just to start its drive step also in a clockwise direction. Coil 113 is no longer energized but the armature 127 is held by corner 33 until the latter clears it and the armature 127 can return.

As a main object, FIG. 15 illustrates an example of a pulse generation for each drive direction and an electrical direction control for a two directional drive with one selecting coil only. It should become apparent that the same transmission control can be obtained in various other ways with different circuitry or modified control means. For example switches 111 and 112 can directly initiate a two directional drive in a remote location using separate coils to control driver 23 or to drive wheel 24 directly.

*Package Model*

Figure 16:
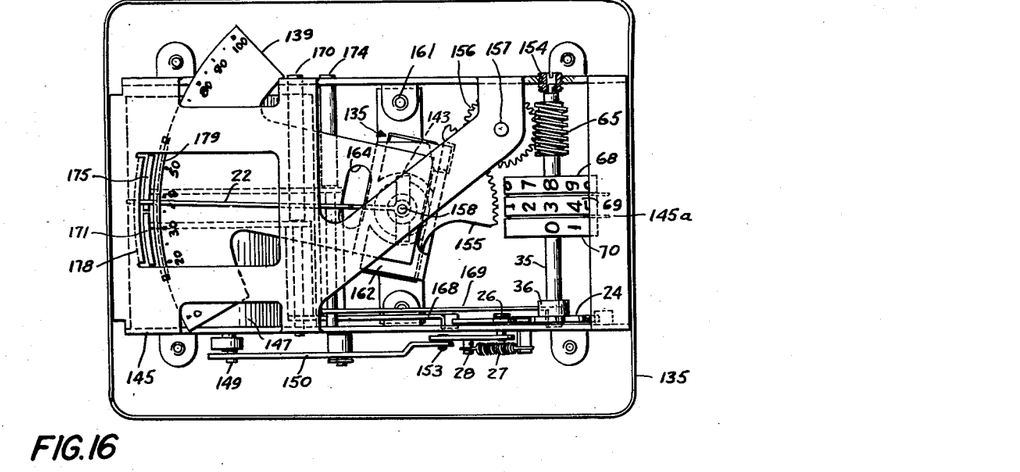
FIG. 16 is a top view of an electrical instrument, showing an application for the analog to digital servo.
Figures 17, 18:
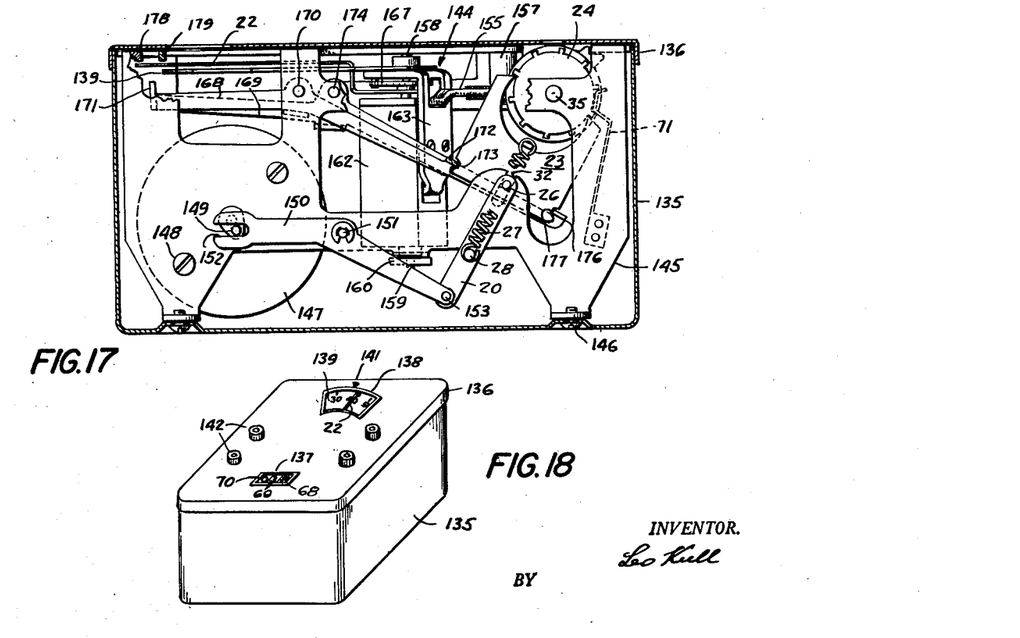
FIG. 17 is the side view of the device shown in FIG. 16.
FIG. 18 is a perspective view of the instrument shown in FIG. 16.

The servo control principle, illustrated schematically in FIG. 10, is shown in a packaged form in FIGS. 16–18 in which instead of a temperature control element an electrical moving coil measuring instrument is shown as the sensing element. In addition to digital readout wheels a pointer and dial are shown which give the same reading as the readout wheels if the system is in balance.

The instrument is enclosed in a case box 135, having a cover plate 136 which has an opening 137 for readout wheels 68, 69 and 70 and a window 138 through which a dial 139 and pointer 22 are visible. A pointer 141, printed on the cover 136 is used to read the dial 139 and indicate the balanced condition if pointer 22 lines up with pointer 141. Terminals 142 are used for the ordinary connection to a coil 143 of the measuring instrument 144.

A U shape sheet metal framework 145 is screwed to case 135 by means of screws 146 and gives the necessary support to the various components and links of the instrument. A drive motor 147 is secured to frame 145 by means of screws 148 and has a proper reduced speed to drive a crankpin 149. The latter reciprocates link 20 by means of a lever 150 which is pivoted at 151. One end of lever 150 has a slot 152 to receive the crankpin 149 and the other end is pivotally secured at 153 to link 20. The latter has a pin 28 for the spring 27 and another pin 26 which slides in a slot 32 and connects link 20 to driver 23, similar to the arrangement shown in FIG. 6.

Wheel 24, shaft 35, indicating wheel 68, 69 and 70 and worm 65 are the same as described hereinbefore. A bearing 154 is screwed to frame 145 in order to make the assembly of shaft 35 possible. Worm 65 drives a sector gear 155 through an idler 156, the latter being rotatably secured to frame 145 by means of a post 157. Sector gear 155 is secured to the body of the ordinary measuring instrument 144, the whole assembly of which is pivotally secured to the frame plate 145 at 158 and to a plate 160 at 159. Plate 160 is secured to the frame 145 by means of screws 161. The measuring instrument consists of the permanent magnet poles 162 and a bracket 163 to which its various components are fastened. Besides sector gear 155 the dial 139 is secured to bracket 163. Dial plate 139 has an opening 164 through which the pointer 22 extends and gives the ordinary reading above dial 139. Pointer 22 is fastened to the frame of coil 143 which has its own bearings co-axial with pivot pins 158 and 159 and the magnetic pull between coil 143 and magnet poles 162 works against a coil spring 167. This is a conventional arrangement and is not described in further details here.

The sensing principle of the instrument is same as in all previously described examples. However, the pointer 22 is not sensed directly by driver 23 but instead levers 168 and 169 are used to serve as connecting links between sensing station and driver 23. Lever 168 is pivoted on a rod 170 which is supported by the frame work 145. An end 171 of lever 168 is bent over to an arcuate shape and can sense the end of pointer 22. The other end of lever 168 is bent over at 172 and works in a notch 173 of driver 23. Similarly lever 169 is pivoted on a rod 174, has an arcuate sensing end 175 and a lug 176 to connect it to a notch 177 of driver 23. A portion 178 of frame 145 is bent over underneath the pointer 22 and another arcuate strip 179, fastened to frame 145 serves as an additional support to pointer 22 during a sensing action.

FIG. 16 shows an unbalanced condition in which pointer 22 is slightly off, indicating a higher value than the reading of the wheels. The link 20, while being actuated by motor 147 moves driver 23 down. This causes both sensing ends 171 and 175 to move upward toward the end of pointer 22. Sensing end 175 will be stopped and during the further movement driver 23 will be tilted to the left. The return stroke of link 20 causes the wheel 24 to be moved one step in a counter-clockwise direction which increases the reading on wheel 68. As previously mentioned, wheel 68 is secured directly to shaft 35 and a decimal Geneva drive carries its movement over to wheels 69 and 70. In the illustration the internal Geneva pinions are not shown, but they are mounted to plates 145a which are prevented from rotation by frame 145.

The correcting step is transmitted to sector gear 155 which turns the complete instrument unit including the pointer 22 in a counter-clockwise direction. Similarly a correction in the other direction or neutral will be a result of sensing the location of pointer 22 as described previously in more detail.

The arrangement just described gives a symmetrical package in which indicating wheels and dial with the pointer are both visible. The pointer also serves the purpose of indicating the unbalanced condition if it does not coincide with the pointer 141. In many cases, however, the pointer and dial are not necessary and a direct sensing with a simplified construction is possible.

The conversion of the readout instrument just described to a regulating instrument is relatively simple and is described here pointing out just the difference. If the electrical measuring instrument 144 is used as a volt meter, for instance, and the regulator has to serve as a voltage regulator, an indirect feedback exists in the system. (The principle is shown in FIG. 11.) Under said circumstances the direct connection between shaft 35 and sector gear 155 will be broken, shaft 35 is used to turn a control device which is able to control the voltage over the desired range and the sector gear will be set by a knob manually. This sets the dial 139 to a desired value and pointer 22 starts controlling the rotation of shaft 35 and control device until it reaches the neutral which is the desired value.

*Universal Servo Control*

Figures 19, 20:
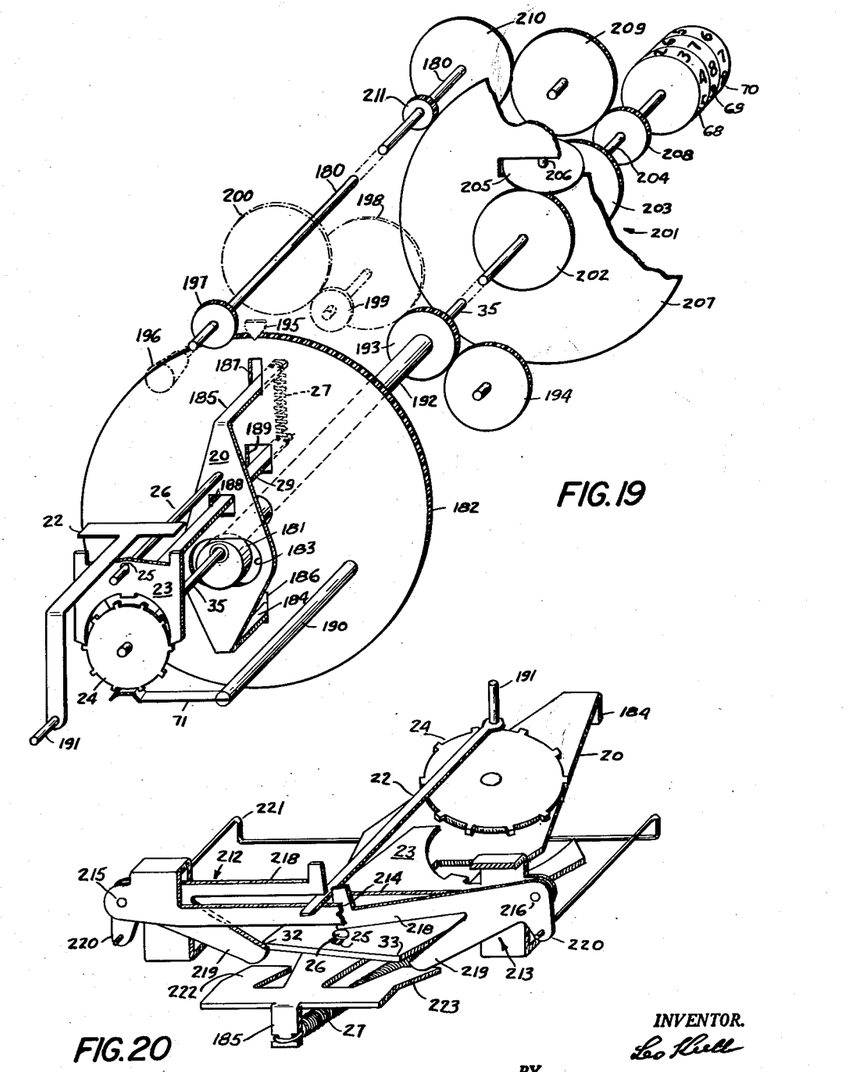
FIG. 19 is a schematic illustration of a servo drive adaptable to various applications.
FIG. 20 is a perspective view of a modified double sensing servo.

A servo control mechanism is illustrated in FIG. 19 which can be adapted to almost any servo application with an appropriate feedback connection in the control loop. The illustration shows schematically a common sensing mechanism, usable in all alternatives and it also shows all the possible feedback variations partly in dotted lines.

The system involves a feedback shaft 180 and a common axis for all four inputs and outputs which include: a low torque servo input to pointer 22, a power input to an eccentric 181, amplified servo output to shaft 35 and feedback to a wheel 182. The sensing and drive parts are again the same as previously described but mounted to the wheel 182 which can rotate them together with itself. The reciprocating link 20 is driven by the eccentric 181 in slot 183 while the link 20 is guided by lugs 184 and 185 in guiding slots 186 and 187. Lug 185 also serves as an anchoring point for spring 27, the other end of it being secured again to lug 29 of driver 23 and which extends through clearance openings 188 and 189 in drive link 20 and wheel 182. Driver 23 has an elongated hole 25 to receive its drive pin 26, the latter being secured and driven by link 20. Drive wheel 24 drives the output shaft 35, the positioning of which is aided by detent spring 71 which is secured to wheel 182 by means of a post 190.

Input pointer 22, driven by shaft 191, is again T-shaped but is bent over for radial sensing by driver 23. Contrary to previous arrangements, pointer 22 can be actuated by any instrument sensing element without the need of gearing the feedback to the instrument dial or to the usually stationary anchoring point of the sensing element.

Eccentric 181 is secured to a hollow shaft 192 which has a drive gear 193 on the other end, the latter being driven by a gear 194 which receives its drive torque from any suitable rotary power source.

Comparing the arrangement with FIG. 11 as a temperature regulator, the pointer 22 may be controlled by the bimetallic coil 60 but whose end is secured to the frame in this case. To set the regulating point, a pointer 195 is secured to the gear 182 and may be set in respect of a stationary dial (not shown) by means of a knob 196 which turns the feedback shaft 180 and gear 197. The setting adjusts the balance point of the sensing mechanism to the desired dial value and the servo starts to turn the output shaft 35 in a direction which turns the temperature control element until the pointer 22 is balanced or reads the same as the pointer 195.

If the regulator is used in a vehicle guidance system, the pointer 22 serves as a guidance indicator (compass needle) which has its direction fixed in respect of the pole of the earth for instance. Pointer 195 in this case may be conveniently fixed to the moving line of the vehicle and the dial, which may be a conventional compass dial, has to be secured to the wheel 182. If the north direction of pointer 22 is used as balance point, the balance line on gear 182 must be located underneath the north position of dial also. The adjusting from knob 196 turns then wheel 182 and dial in respect to the stationary pointer 195 and sets the course. Any declination in the course will be sensed by driver 23 and the correcting information will be sent to shaft 35 which turns the steering of the vehicle until it is on the course again.

A third basically different regulator is the speed governor which is illustrated in one form in FIG. 13. Pointer 22 in this case may be driven by a time keeper device such as a balance wheel controlled time movement. Wheel 194 may be driven by a power source on which speed governing is desired and the output shaft 35 can be used to control the speed controlling servo drive.

The principle of governing is to select a suitable speed to pointer 22 and let the wheel 182 to follow the rotation of pointer 22. If wheel 194 is driven by a D.C. motor for instance, it secures to the shaft 35 a maximum regulating rate of 1/10 of a revolution per 1 revolution of shaft 192 and through a reduction geartrain 193, 198, 199, 200 and 197 to wheel 182 a speed which in a maximum load and lowest voltage condition should not fall below the input speed of pointer 22. Any excess speed will cause the change of relationship between pointer 22 and follow-up wheel 182 and will result in turning the shaft 35 which in turn cuts down the speed. The opposite regulating action happens in case of the slow-down of wheel 182.

The system has the advantage of having no cumulative error between input and output and may suit well in governing small D.C. motors as well as large A.C. generators for precisely timing A.C. cycles. Further, the driving spring power of a balance wheel speed control can be constantly rewound by the feedback movement of wheel 182 because the speed of pointer 22 and wheel 182 are same and the rate of rewind on the one end of drive spring equals the used energy on the other end of the spring.

The regulating servos, just described belong to the indirectly closed loop class. In the closed servo the output from shaft 35 is geared by a suitable reduction gearing to wheel 182 and at the same time is used to do some useful work. If the system is used as a mechanical torque amplifier or a follow-up servo, a proper reduction gearing from shaft 35 to feedback shaft 180 has to be used (not shown). The small torque input movement of pointer 22 in either direction is then sensed by driver 23 which delivers the result of sensing to wheel 24 and shaft 35. Consequently the movement of pointer 22 causes the wheel 24 to be moved in the same direction a greater step which after gear reduction to wheel 182 will equal the movement of input pointer 22.

To adapt the mechanism to an analog to digital servo for turning counting wheels 68, 69 and 70 (like in FIGS. 10 and 14), a differential gearing 201 must be added. In a rotating sensing mechanism the wheel 24 is stepped in relationship to wheel 182 and indexed by detent 71, but the feedback to wheel 182 adds a small additional rotation to the wheel 24 and if counting wheels were attached to shaft 35 directly, they do not maintain their index with respect to the framework.

The differential 201 in the present case acts as a compensator to the error just mentioned. Shaft 35, therefore, will be connected to a wheel 202 as one side of the differential and counting wheel 68 is secured to a wheel 203 by means of a shaft 204 as the other side of the differential. A reversing or spider gear 205 is rotatably mounted to a shaft 206 carried by a gear 207. Shaft 204 also rotates a feedback pinion 208 which delivers its rotation to the feedback shaft 180 by means of an idler gear 209 and a gear 210. Feedback shaft 180 drives through pinion 197 the wheel 182 and through another pinion 211 the wheel 207 but with half the speed of gear 182.

Considering now the wheel 207 to be stationary, the rotation of shaft 35 is transmitted to shaft 204 with the same speed but in the opposite direction. Moving the gear 202 and 207 in the same direction but the gear 207 with half the speed of gear 202, the gear 203 stays stationary. In actual operation the gear 202 receives two movements in the same direction from wheel 24: a rotary step from driver 23 which advances counting wheel 68 one step in the opposite direction to wheel 24 and a small feedback movement which advances wheel 182 together with wheel 24 a little further. The same feedback movement, however, advances wheel 207 in same direction and consequently the feedback movement is not transmitted to counting wheels from wheel 24 and they stay in index.

Comparing now the analog to digital servo just described to the one shown in FIG. 14 which also does not use the anchoring end of the sensing element, it can be seen that the small added complexity of using the rotating sensing arrangement and the differential makes possible a limitless control range and the mechanism can be used to sense any needle instrument.

A different sensing arrangement is shown in FIG. 20 which can be used in place of the one shown in FIG. 19. In this, the ponter 22 rotatable by shaft 191 can be any ordinary light instrument needle without a special end-shape. The same sensing principle is used here, only the sensing is done in two steps: first, the pointer 22 is sensed for positioning two sensing levers 212 and 213 and secondly, the position of said sensing levers is used to set up the driver 23 as the secondary sensing action. The arrangement is somewhat similar to the one shown in FIG. 14.

The mechanism supported by a bracket 214 which can be mounted to wheel 182. It serves as a guiding means for sensing levers 212 and 213, provides pivot points for them at 215 and 216 and gives a support to pointer 22 during sensing. Levers 212 and 213 are identical and each has three arms: a sensing arm 218, a blocking arm 219 and a spring arm 220 which has a hole to receive the ends of a wire spring 221 which forces both sensing arms 218 downward and which can be conveniently anchored to two holes, cut into gear 182.

The drive parts are similar to the ones shown in FIG. 19, except drive link 20 has two cam surfaces 222 and 223 for actuating sensing levers 212 and 213. Normally the blocking arms 219 are pushed up by them and sensing arms 218 will clear the pointer 22 giving it an unrestricted movement. As the link 20 together with driver 23 starts moving forward, slopes on cams 222 and 223 let sensing levers 212 and 213 down. During this, one of them, or both, in a neutral case, will be stopped by pointer 22 and a little before the end of the stroke, arms 219 act as blocking means for sensing corners 32 and 33. In FIG. 20 lever 212 is stopped by pointer 22, its blocking arm 219 blocks the corner 32 and driver 23 is tilted to the right for a clockwise drive step which follows during return stroke of driver 23. Lever 213 is moved all the way down and blocking arm 219 lets corner 33 pass over it. In case of neutral, both corners 32 and 33 will be blocked, driver 23 will not be tilted and no drive stroke follows. Elongated hole 25 makes the full stroke of link 20 again possible.

The advantages of a double sensing are the extreme accuracy whereby the overlap $a+b$ can be made very small, a few thousands of an inch overlap is able to stop the arm 218 during sensing. Further, the sensing levers 212 and 213 and spring 221 can be made very light and consequently the lightest instrument needle can serve as an input means whereby the sensing of it is not disturbing the operation of the needle or using up, the torque of it.

Dual Servo Control

Figures 21, 22:
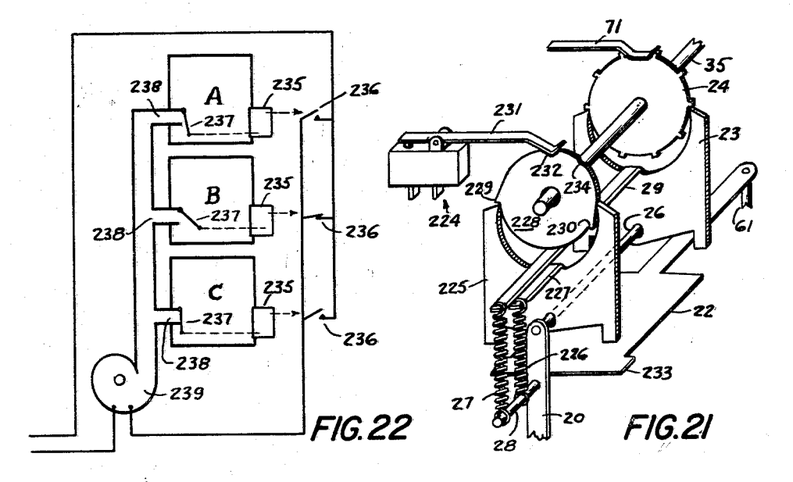
FIG. 21 shows a schematic illustration of a dual regulating servo control.
FIG. 22 is a schematic illustration of one application of the dual control servo of FIG. 21.

For some control applications a dual servo control gives the desired answer. To this class belong a simultaneous regulating and limit control servo as such might be useful in some temperature control applications. A dual control arrangement of that kind is illustrated in FIG. 21 which includes a regulator as shown fully in FIG. 11 and as a secondary function it provides means for operating a limit switch 224 which can be used to turn a heat generating device on and off. The latter can be compared to an ordinary room temperature control device which turns the heat generator on if the temperature in the room reaches a preset low limit, and after the room has been heated to a certain high limit, the switch and the heat generator is turned off again.

Shaft 61 may be controlled by the bimetallic coil 60 (FIG. 11) turning the pointer 22 which in turn controls the regulating shaft 35 as previously described. To operate the switch 224, another driver 225 is mounted to driver pin 26 with a spring 226 between pin 28 and lug 227 acting the same way as for driver 23. Driver 225 operates a wheel 228 which is rotatably mounted to shaft 35. It has only two positions: an "off" and "on" position which are controlled by two driving teeth 229 and 230. In FIG. 21 the switch 224 is shown in an "off" position, an actuator 231 of it resting in a deep notch 232 of wheel 228.

During the sensing strokes the pointer 22 controls the regulating action of shaft 35 and at the same time driver 225 senses a wider section 233 of it. This gives a wider overlap to driver 225 than to driver 23. If the regulating control is not able to maintain the desired temperature anymore the pointer 22 moves further in a counter-clockwise direction, as the temperature falls for instance, until driver 225 will be also tilted to the left. Tooth 230 will be now picked up by driver 225 and wheel 228 is driven one step in a counter-clockwise direction which cams actuator leaf 231 up and turns on the switch 224 and the heater. A small notch 234 can act as a detent for wheel 228 thereby. During succeeding strokes driver 225 might be still tilted to the right but wheel 228 cannot be turned because there are no more teeth. As the temperature starts rising now, pointer 22 starts moving in a clockwise direction and driver 225 reaches neutral sensing. This lasts until the other limit is reached and driver 225 will be tilted to the right. It picks up the tooth 229 now and turns the wheel 228 in a clockwise direction one step which causes the switch 224 and heater to be turned off.

FIG. 22 illustrates schematically the application of the dual control just described, for an individual room temperature control. The system has the rooms A, B, and C, each having its own control unit 235 comprising a switch 236 and a door 237 of an air duct 238. The heat is supplied by a heater 239 which can be turned on by any of the switches 236 and off if all the switches 236 are off. Each of the control devices 235 can be set to a different desired temperature and each one can perform a dual function to maintain the set temperature. First the regulating shaft 35 tends to set the door 237 to a position which lets just the proper amount of heat to flow to the room and if this is not sufficient, switch 236 takes over and turns on the heater 239.

In the schematic showing of FIG. 22, let it be assumed that in room A a medium temperature is desired, in room B a higher temperature and in room C a lower temperature is set. If the door 237 to room B after opening all the way is not sufficient to let in enough heat, the switch 236 is closed and the heater is started. In room C the regulator closes the heat door and prevents any additional heat flow, while in room A the door will be adjusted half the way open in order to maintain a medium temperature.

Figures 23, 24:
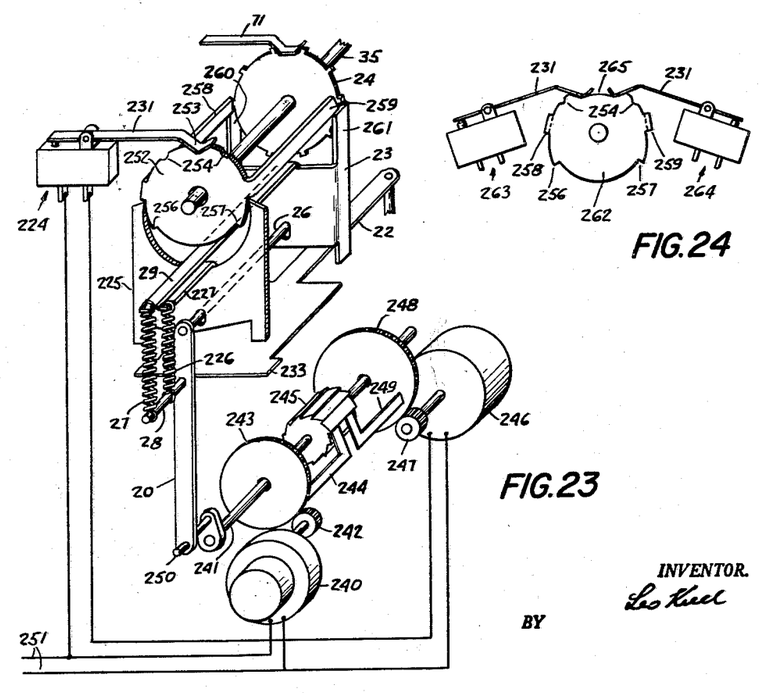
FIG. 23 is a schematic illustration of a modified two speed dual control servo.
FIG. 24 is a detail of a modified switching means for a dual servo control.

A different application for a dual control is illustrated in FIG. 23. In some regulating or closed loop applications which have to be kept in continuous operation, a slight servo output is required most of the time and a comparatively greater or faster output is required during some small time periods. It is not practical therefore to keep a powerful motor with a fast sensing cycle in operation. An inexpensive timing motor with a sensing stroke few times a minute or even an hour might be sufficient to give a slow output most of the time and in the same time maintain a control over the need for additional speed and power in order to keep the system balanced.

In its construction, a timing motor 240 rotates a shaft 241, the pinion 242 of which drives a gear 243 which is loosely mounted on the shaft 241 and drives by means of a one directional drive pawl 244 a ratchet wheel 245 which is secured to shaft 241. Another motor 246 can drive the ratchet wheel 245 in the same way by means of a pinion 247, wheel 248 and a drive pawl 249 but with faster speed. Both motors therefore can rotate a crank 250 which is secured to the end of the shaft 241 and which reciprocates link 20 together with drivers 23 and 225. Motor 240 is connected to powerlines 251 for a continuous operation while motor 246 can be turned on by switch 224 only.

The object of the dual control is to sense the pointer 22 by means of driver 23 for driving the servo control shaft 35 and in case a certain maximum off-balance is reached, it is able to start another motor which drives the wheel 24 with a faster speed until the balance is reached again. Switch 224 is controlled by a cam wheel 252 which is actuated by driver 225. In the illustration the switch 224 is in an off position, its operating lever 231 resting in a deep notch 253. A step of wheel 252 either way can turn switch 224 on while its lever 231 is aiding for detenting in small notches 254. Wheel 252 also has two driving teeth 256 and 257 and two ears 258 and 259 which can coact with bent over drive pawls 260 and 261 of driver 23.

In normal operation driver 23 will be driven by motor 240 with a slow speed. If now the pointer 22 starts moving to the left for instance and if driver 23 is not able to perform a correcting action fast enough and further movement of pointer 22 results, driver 225 will be tilted to the right. It now picks up the tooth 256 and turns the wheel 225 one step in a clockwise direction which turns the motor 246 on and both drivers 23 and 225 start acting with a greater speed. They both will be tilted the same way but driver 225 cannot move wheel 252 any further because there are no more drive teeth for this direction. As the result, the correcting action starts with a faster speed and pointer 22 starts moving toward the balance point. Driver 225 soon reaches its neutral sensing without driving wheel 252. The return step to the off position to wheel 252 is given by driver 23 as soon as the pointer 22 reaches the balance point which causes the driver 23 to sense a neutral and this in turn causes the pick-off of ear 259 by pawl 261, the return of wheel 252 to the off position and stopping the motor 246.

If the pointer 22 moves far enough to the right the same happens: switch 224 starts the motor 246 which speeds up the correcting action until the balance point is reached again and the slow motor 240 takes the control over again.

A slightly modified cam wheel 262 is shown in FIG. 24 which can control two micro-switches 263 and 264. Their operating levers 231 are resting in a wide notch 265 and are keeping switches 263 and 264 normally open. Wheel 262 can be used in place of wheel 252 in FIG. 23 but a clockwise step to it can turn switch 263 on and leave switch 264 open while a counter-clockwise step from the normal position is doing the opposite. The return step to wheel 262 is given again by driver 23 at balance point. Switches 263 and 264 can be used to control various additional functions in the servomechanism. They can be used for instance to control the direction of rotation of a booster motor instead of motor 246 in FIG. 23. They also can be used in a regulating system like the one shown in FIG. 22 in which one of the switches can turn on a heater if the temperature reaches a set low mark and turns it off if the balance is reached. The other switch might be used to turn on the cooler or air conditioning system if a set high temperature mark is reached and turn it off in a balance point again. With a control unit at this kind in each room an independent heater-cooler regulating and on-off control is possible giving an ultimate temperature control thereby.

Summary

In the foregoing specification the most characteristic examples of the servo family are described. They all employ the new basic drive principle: a two directional stepper drive, the direction of which being controlled in most cases directly by an instrument needle. Almost any needle instrument can serve as an input for a digital read-out or for a regulating servo as described above. The fact that no torque of the needle is consumed during sensing makes it possible to employ very delicate instruments if the sensing rate is not too high. The sensing time during which the needle is sensed and prevented from moving is determined by the nature of power input strokes. If a common crank is used as in FIG. 17, the sensing time is about one quarter of the cycle. In most applications this is very satisfactory, however, drive strokes can be easily obtained in which the sensing contact with the pointer can be made very small timewise.

Greater sensing accuracy can be obtained with the arrangement shown in FIGS. 9 and 20. The sensing levers shown there are able to sense an instrument needle directly where a movement of a few thousandths of an inch can control the direction of the drive. In that case any looseness in the feedback system, such as play in bearings or gear backlash can affect the accuracy of the servo unit. To overcome this, well known means to take off the backlash such as spring biased gears have to be used. Most instruments, however, have working limits and a spring bias applied somewhere to the feedback loop, can take care of all the backlash as well as any bearing looseness in the system. In FIG. 10 for instance a torsion spring applied to wheel 62 can take up all the backlash and the end play of shaft 35.

On the other hand in many applications the high accuracy is not the first importance. In a household continuous oven temperature regulator for instance, an accuracy of few degrees is sufficient and an inexpensive construction is the first importance. The backlash in this case should not be a problem and a T-shaped pointer which is sensed directly can satisfy the requirements.

Since it is the object of this invention to introduce a new servo drive principle adaptable to many different servo control loops, the details of which can greatly vary in their size, operating speed and controlling nature, it will be understood that various changes and substitutions in the form and details of the most characteristic examples illustrated, may be made by those skilled in the art without departing from the spirit of the invention. It is the intention, therefore, to be limited only by the scope of the following claims.

What I claim is:

1. In a servo control system, a two-directional intermittent drive comprising an output member capable of movement in opposite directions, a driver for said output member, a control means movable in relation to said output member and a power input means for reciprocating said driver in respect to said output member and control means and providing alternately a sensing stroke and a power stroke of the driver, said driver being tiltable with respect to the input means and having a pair of sensing arms and a pair of drive arms, at least one of said sensing arms interfering with the position of said control means during a sensing stroke of the driver, said interference causing a tilting action of said driver solely by the energy of said power input means and said tilting action setting up one of said drive arms to control the direction in which said output member will be driven by said driver during the power stroke imparted to said driver by said power input means.

2. A servo control system according to claim 1, wherein the output member is a toothed wheel, the control means has a low torque, and the interference which causes a tilting action of the driver does not consume any energy of the control means.

3. A servo control system according to claim 2, wherein the teeth on the toothed wheel are diametrically spaced and the sensing arms on the driver are spaced apart a distance slightly less than the width of the part on the control means which engages said sensing arms, whereby the position of the control means in relation to the sensing arms will be in one of three relations at the end of each sensing stroke of the driver to cause a clockwise drive step, a counter-clockwise drive step or a neutral position in which no movement will be imparted to said toothed wheel during the power stroke of the driver.

4. In a control system, a two-directional intermittent drive comprising a symmetrical toothed wheel capable of movement in opposite directions about its center, an actuating element for driving said toothed wheel and having a pair of spaced driving arms and a pair of spaced sensing points, said pairs of arms and points having a common line of symmetry with said wheel and with a driving arm and a sensing point on opposite sides of said line of symmetry in lines at a right angle to said line of symmetry, a control means movable in relation to said toothed wheel and a drive link pivotally connected to the actuating element on its line of symmetry for reciprocating said actuating element transversely to the control means and providing alternately a sensing stroke and a power stroke for the actuating element, an overcenter spring connected respectively to the actuating element and to the drive link and acting resiliently about said line of symmetry, the relative position of the control means to the sensing points on the actuating element during the sensing stroke thereof by the link operating to set up the driving arms on the actuating element in relation to the toothed wheel for controlling the direction in which the toothed wheel will be driven during the power stroke of the link, the sensing for said actuating element taking place during each sensing stroke solely by the energy of said drive link.

5. A control system according to claim 4 wherein the control means is a T-shaped member, the cross-head of which is movable in a plane perpendicular to the common line of symmetry, the length of the cross-head of the T-shaped member being greater than the distance between the sensing points, the position of said cross-head in relation to the sensing points at the end of the sensing stroke controlling the direction in which the toothed wheel will be driven.

6. A control system according to claim 4, wherein the control means comprises a pivoted instrument pointer, each sensing point is carried by a separate lever pivotally connected to the actuating element and movable toward said instrument pointer together with the actuating element during the sensing stroke of the actuating element and said pointer being adapted to stop one or both of said sensing points and thereby set-up the actuating element for controlling the direction in which the toothed wheel will be driven.

7. A control system according to claim 4, wherein the control means is a low torque input pointer controlled by a measuring element and wherein a balanced condition normally exists between the pointer and the sensing points on the actuating element and in which balanced condition no drive of the toothed wheel takes place, an unbalanced condition being restored to balance through transmission gearing operable by the rotation of the toothed wheel and disposed between said toothed wheel and the measuring element.

8. A control system according to claim 7, wherein said input pointer, said toothed wheel and a feedback wheel are coaxially arranged, said actuating element mounted to said feedback wheel with a radial reciprocation line, the rotation of the toothed wheel rotates at least one counting wheel for a numerical readout, said counting wheel being connected to said toothed wheel through a differential drive, the rotation of said counting wheel being also geared to the transmission gearing in a manner such that any feedback step rotating said feedback wheel together with said toothed wheel will cancel the feedback step to said counting wheel.

9. A control system according to claim 7, wherein the measuring element has an anchored end and a controlling end, the transmission gearing connecting said anchored end to said toothed wheel drive, the controlling end actuating the input pointer, whereby any change in said measuring element causes a departure from the balanced condition and a rotation of the toothed wheel in a direction which causes said anchored end of the measuring element and said input position to be rotated in a direction opposite to said unbalance and a distance equal to said unbalance.

10. A control system according to claim 9, wherein the measuring element has an anchored end and a controlling end, said controlling end actuating the input pointer, said anchoring end being secured to a dial which is manually adjustable in respect to a fixed pointer, said dial giving the reading of said measuring element in respect to said input pointer, said drive parts adapted to move a regulating device in a direction which causes the input pointer to move toward said fixed pointer which indicates a desired reading.

11. A control system according to claim 4, wherein the control means is a low torque input pointer controlled by a measuring element and wherein a balanced condition normally exists between the pointer and the sensing points on the actuating element and in which balanced condition no drive of the toothed wheel takes place, an unbalanced condition being restored to balance by a regulating device, the actuation of which is controlled by said toothed wheel.

12. A control system according to claim 11 wherein a secondary driver is adapted to sense and drive simultaneously with said primary driver the position of said input pointer, said secondary driver being also driven by said drive link, said secondary driver driving a two-position secondary toothed wheel having two drive teeth, said secondary toothed wheel controlling a two position output effect, one of said positions of said toothed wheel maintaining said output effect in one of its positions and the other of said positions maintaining said output effect in its other position, said secondary toothed wheel being controlled by said secondary driver, said secondary driver having a greater overlap between said sensing corners and said input movement means than said primary driver, said secondary driver being tilted after the continued movement of said input means and after the failure of said primary driver to perform a sufficient regulation, said tilting of said secondary driver driving said toothed wheel one step, the continued tilting of said secondary driver in same direction resulting in no further drive steps to said toothed wheel, the further movement of said input means in the opposite direction resulting in a tilting to said secondary driver in the opposite direction, said tilting causing said toothed wheel to be returned to its original position.

13. A control system according to claim 12 wherein said secondary toothed wheel actuates an electric switching means, one of said positions of said toothed wheel keeping said switching means open, the other of said positions closing said switching means for initiating a condition changing means capable of moving said input pointer to the opposite direction to the direction which initiated said switching closure, said condition changing means staying initiated no longer than said affected input movement has reached a position causing a tilting to said secondary driver in the opposite direction to the direction which caused said initiation, said tilting being followed with a drive step to said toothed wheel, said toothed wheel operating said switching means for stopping the action of said condition changing means.

References Cited in the file of this patent

UNITED STATES PATENTS

| | | |
|---|---|---|
| 1,073,025 | Bullock | Sept. 9, 1913 |
| 1,446,267 | Newcomb | Feb. 20, 1923 |
| 1,526,125 | Fellows | Feb. 10, 1925 |
| 1,704,904 | Schaub | Mar. 12, 1929 |
| 2,029,169 | Hironaka | Jan. 28, 1936 |
| 2,150,014 | Walter | Mar. 7, 1939 |
| 2,558,953 | Henninger et al. | July 3, 1951 |
| 2,714,284 | Gazda | Aug. 2, 1955 |
| 3,020,774 | Kullman | Feb. 13, 1962 |

UNITED STATES PATENT OFFICE
CERTIFICATE OF CORRECTION

Patent No. 3,124,967  March 17, 1964

Leo Kull

It is hereby certified that error appears in the above numbered patent requiring correction and that the said Letters Patent should read as corrected below.

Column 7, line 30, for "drivers" read -- driver --; column 14, line 49, for "ponter" read -- pointer --; line 58, after "mechanism" insert -- is --; column 15, line 41, for "driver" read -- drive --; column 16, lines 9 and 10, for "asassumed" read -- assumed --; column 18, line 39, for "engages" read -- engage --; column 20, line 16, for "maintainng" read -- maintaining --.

Signed and sealed this 28th day of July 1964.

(SEAL)

Attest:

ESTON G. JOHNSON
Attesting Officer

EDWARD J. BRENNER
Commissioner of Patents